Patented Mar. 11, 1930

1,750,227

UNITED STATES PATENT OFFICE

GEORG KRÄNZLEIN, OF HOCHST-ON-THE-MAIN, AND ERICH KRONHOLZ, OF BAD-SODEN-ON-THE-TAUNUS, AND FRITZ ROEMER, OF HOCHST-ON-THE-MAIN, GERMANY, ASSIGNORS TO GENERAL ANILINE WORKS, INC., OF NEW YORK, N. Y., A CORPORATION OF DELAWARE

ACID WOOL DYESTUFFS OF THE ANTHRAQUINONE SERIES

No Drawing. Application filed December 9, 1927, Serial No. 238,990, and in Germany December 14, 1926.
Renewed December 11, 1929.

Our present invention relates to acid wool dyestuffs of the anthraquinone series and processes of preparing them.

The dyestuff obtainable by causing 1-amino-4-bromanthraquinone-2-sulfonic acid to react with para-aminoacetanilide has a great technical value owing to its good levelling power.

We have found that similar dyestuffs of even more valuable levelling properties are obtained by causing bromaminoanthraquinone-sulfonic acid to react with a derivative of para-aminoacetanilide alkylated in the acetylamino group in the presence of a copper catalyst such as copper or a compound thereof, in particular a copper salt. The bases used for the reaction have the following general formula:

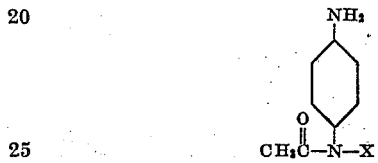

wherein X stands for an alkyl or aralkyl group, for instance methyl, ethyl, benzyl or the like.

The following example illustrates our invention, but it is not intended to limit it thereto, the parts being parts by weight:

10 parts of sodium 1-amino-4-bromanthraquinone-2-sulfonate, 7 parts of 4-amino-1-methylacetanilide, 7 parts of sodium bicarbonate and 0.5 part of copper sulfate in 80 parts of water are kept on the water-bath at 60° C. to 80° C. until the formation of the dyestuff is complete, which is usually the case after 2 to 3 hours. The dyestuff is salted out with sodium chloride or potassium chloride, filtered and, if required, purified by redissolving. It constitutes laminæ of a bronze luster dissolving in water to a blue solution.

The dyestuff has the formula:

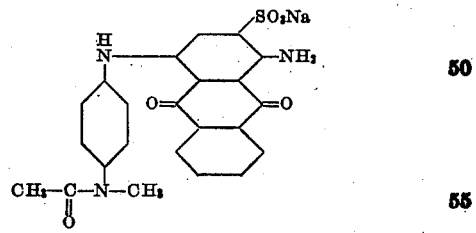

It dyes wool blue tints and is easily soluble in water. It has excellent properties as to fastness to light and possesses a great levelling power. Other halogenamino-anthraquinone-sulfonic acids may be used with similar results.

In the following claims the term "copper catalyst" is intended to comprise not only the metal itself but also copper compounds, particularly its salts, and by the expression "sulfonated in the 2-position" we mean to include those 1-amino-4-brom-anthroquinone compounds which contain in the 2-position either sulfonic acid itself or an alkali metal salt thereof.

We claim:

1. As new products, the dyestuffs of the following constitution:

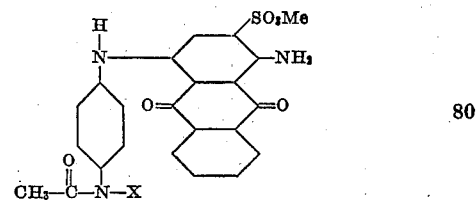

wherein X stands for an alkyl or aralkyl group and Me for an alkali metal or for hydrogen dyeing wool blue tints, being easily soluble in water, having excellent properties as to fastness to light and possessing a great levelling power.

2. As a new product, the dyestuff of the following composition:
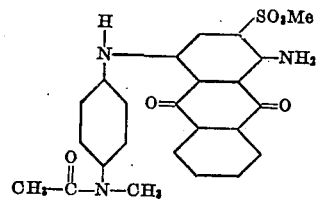
wherein Me stands for an alkali metal or for hydrogen dyeing wool blue tints, being easily soluble in water, having excellent properties as to fastness to light and possessing a great levelling power.
In testimony whereof, we affix our signatures.
GEORG KRÄNZLEIN.
ERICH KRONHOLZ.
FRITZ ROEMER.